Patented May 17, 1938

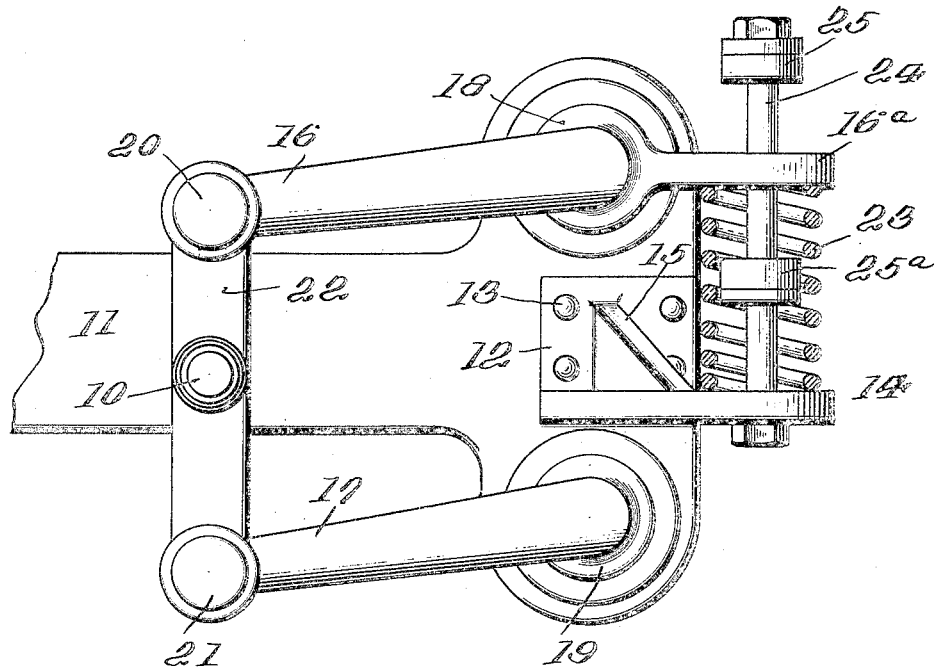

2,117,589

UNITED STATES PATENT OFFICE 2,117,589

SUSPENSION ARRANGEMENT FOR ROAD VEHICLES

Fullerton George Gordon Armstrong, Beverley, England

Application July 27, 1935, Serial No. 33,609
In Great Britain November 29, 1933

1 Claim. (Cl. 267—20)

The present invention relates to new and useful improvements in suspension arrangements for vehicles of the general type shown and described in my co-pending application, Ser. No. 754,528, filed November 23, 1934, of which this application is a continuation in part.

More particularly, the present invention relates to suspension arrangements for vehicles of the type in which the frame of the vehicle has a pair of pivots spaced from one another and carrying levers. The opposite ends of the levers are attached to a link carrying the axle of a wheel and the displacement of the levers about their pivots is restrained by resilient means to the desired extent.

An object of the invention is to provide a vehicle suspension arrangement of the above type, wherein the levers and the link form three sides of a quadrilateral with the fourth side constituted by the frame between the spaced pivots.

A further object of the invention is to provide a vehicle suspension arrangement of the above type, wherein resilient means are provided for resisting displacement of the three sides constituted by the levers and the link relative to the fourth side which is constituted by the vehicle frame.

A still further object of the invention is to provide a vehicle suspension arrangement of the above type, wherein the resilient means is substantially vertically applied between a lever and the frame for resisting displacement.

By "resilient means" is meant any system of variable loading such as, for example, one or more springs which may be of the coil type, rubber blocks, pneumatic means, or again, hydraulic resistance means.

The above and other objects of the invention will in part be obvious and will be hereinafter more fully pointed out.

In the accompanying drawing,

The figure is a fragmentary side elevation showing the improved suspension arrangement.

Referring to the accompanying drawing, a wheel axle is diametrically illustrated at 10. This axle may be that of a front or rear wheel or again of a driving or steering wheel, whether such be a front or rear wheel. Furthermore, the axle may be common to both wheels, either at the front or rear, or it may represent a stub or half axle operative within the side wheel only, thereby enabling the suspension of one wheel to be independent of the others.

A portion of the vehicle frame is illustrated at 11 and this frame includes a bracket 12 which is suitably secured thereto as by rivets 13 or the like. The bracket 12 includes a lateral extension 14 and a connecting reinforcing rib 15. Upper and lower levers 16, 17, respectively, are pivoted to the frame at 18, 19, respectively. The free ends of these levers are pivotally connected at 20, 21 to a link or swivel pin 22 which carries the axle 10. Thus, when the levers 16, 17 are displaced relative to the frame 11 about the pivots 18, 19, the link or swivel pin 22 retains its position in a substantially vertical plane so that the link 22 and the levers 16, 17 form part of a parallel link arrangement, the remaining fourth side of which is constituted by the frame 11 between the pivots 18, 19.

The lever 16 is provided with a portion 16a which extends beyond the pivot 18. A coil spring 23 is disposed between the lateral extension 14 on the bracket 12 and the under side of the extended portion 16a of the lever 16. A rod 24 is secured to the lateral bracket extension 14 and extends upwardly within the spring 23 and through the extension 16a of the lever 16. The rod 24 carries a pair of bumper pads 25, 25a which prevent displacement of the lever extension 16a beyond predetermined limits.

From the foregoing description, it will be seen that an extremely simple and efficient suspension arrangement is herewith provided. The bumper pad 25a limits compression of the spring 23 and the bumper pad 25 is adapted to limit the rebound of the parts to their normal position. Displacement of the levers 16, 17 and the link 22 is thus resisted by compression of the spring 23 abutting against the under side of the lever extension 16a and the bracket extension 14. The levers 16, 17 may assume any angular position with respect to the longitudinal plane of the vehicle.

It is to be clearly understood that minor changes in the details of construction and arrangement of parts may be made without departing from the scope of the invention as set forth in the appended claim.

I declare that what I claim is:—

A wheel suspension arrangement for vehicles, comprising a vehicle frame, a vehicle wheel, a link carrying the axle of said wheel and of constant angularity relative to said frame, upper and lower transverse pivots on said frame at one side of the wheel axle, upper and lower levers pivotally interconnecting said pivots on said frame with the ends of said link and with the levers extending in the same direction from said link toward said frame, said levers and said link constituting three sides of a quadrilateral with the vehicle frame representing the fourth side, one of said levers having an extension extending beyond the adjacent pivot, a bracket rigidly secured to said frame and extending outwardly therefrom, a coil spring vertically applied between and abutting against the free end of said bracket and the extension on the lever for resisting displacement between said levers and said frame on the application of a load to the vehicle wheel, a rod extending co-axially of said coil spring and secured to said bracket, and means including a bumper pad carried by said rod and cooperating with said extension for limiting displacement of said lever.

FULLERTON GEORGE GORDON ARMSTRONG.